COMBINED VOICE AND FACSIMILE SYSTEM

Filed June 1, 1946

3 Sheets-Sheet 1

INVENTOR
E. F. WATSON
BY
R. C. Perry
ATTORNEY

INVENTOR
E. F. WATSON
BY R. C. Lerry
ATTORNEY

INVENTOR
E. F. WATSON
BY R. C. Terry
ATTORNEY

Patented May 2, 1950

2,506,437

UNITED STATES PATENT OFFICE 2,506,437

COMBINED VOICE AND FACSIMILE SYSTEM

Edward F. Watson, Larchmont, N. Y., assignor to Bell Telephone Laboratories, Incorporated, New York, N. Y., a corporation of New York Application June 1, 1946, Serial No. 673,749

19 Claims. (Cl. 179—2)

This invention relates to communication systems and particularly to a combined telephone and picture transmission system.

An object of the invention is to interpolate picture signals on a telephone channel during silent intervals in speech transmission.

Another object of the invention is to control the transmission of picture signals in accordance with the presence or absence of speech, so that when speech is impressed on the channel the transmission of picture signals is suspended.

Another object of the invention is to scan each line of the picture repetitiously until the uninterrupted transmission of signals representing a full picture line has been accomplished.

Another object of the invention is to route the speech and picture signals to their respective receivers at a receiving station.

Another object of the invention is to record the received picture signals preparatory to transferring them to a picture reproducing device.

Another object of the invention is to delete received and recorded picture signals representing an interrupted line, and accordingly to apply to the picture reproducing device only signals representing complete uninterrupted lines.

The invention features a speech controlled switching device for disconnecting the picture transmitter from the communication channel.

The invention also features a speech delay element for affording the speech controlled switching device time in which to disconnect the picture transmitter before speech is impressed on the communication channel.

The invention also features an arrangement for causing the picture transmitter to be reconnected to the communication channel only at the beginning of the scanning of a line of the picture.

The invention also features a magnetic recorder for recording the picture signals at the receiving station.

The invention also features an arrangement for connecting the picture reproducing device to the pick-up magnet of the magnetic recorder only upon the recording of signals representing a complete line of the picture.

Another feature of the invention is that when two-way telephone communication is carried on over separate paths, picture signals may be transmitted continuously over either path while speech signals are transmitted over the other path, since the participants in such telephone communication do not talk simultaneously, and one or the other of the paths is usually idle from the standpoint of speech transmission.

In accordance with the preferred embodiment of the invention the picture transmitter comprises a continuously rotating cylinder around which is wrapped a picture to be transmitted, and a scanner comprising a light source, an oscillator controlled shutter for chopping the light beam, an optical system for focussing a spot of light on the picture, a photoelectric cell responsive to light reflected from the picture, an amplifier and a low-pass filter. Due to the rotation of the cylinder the picture is scanned in circumferential bands or lines. Advancement of the spot of light from line to line is controlled by the rotating cylinder and by a switching mechanism which prevents advancement except upon the complete and uninterrupted transmission of signals representing a line.

The speech input apparatus includes a telephone transmitter, a delay network, a speech suppressor, an amplifier-rectifier for speech signals, and switching mechanism controlled by the amplifier-rectifier for disabling the suppressor and for disconnecting the picture transmitter from the communication channel. When speech is impressed on the speech transmitter the amplifier-rectifier responds to the speech current and disables the suppressor, thus permitting the speech current, delayed slightly by the delay network, to be transmitted. The amplifier-rectifier also operates relays to disconnect the picture transmitter from the communication channel. When speech currents cease to flow, as at the end of a telephone conversation or during a pause therein, the suppressor is reactivated and the circuit is prepared for reconnecting the picture transmitter to the communication channel. Timing mechanism associated with the picture transmitter delays the reconnection until the scanning mechanism completes the scanning of the line then being scanned and begins the rescanning of the same line. If the picture transmitter remains connected to the communication channel long enough to transmit the signals representing the complete line, the scanning mechanism is advanced to the next line. However, if speech signals interrupt the scanning of the line the advancement of the scanning mechanism to the next line is suppressed.

During the intervals in which the picture transmitter is connected to the communication channel, the output of a control tone generator is also connected to the channel, so that the control tone is continuously transmitted. At the receiving station a rectifier responsive to this tone operates a switching relay to connect the communication channel to a picture receiver. When the control tone is absent telephone receiving equipment is connected to the channel.

Received picture signals are impressed upon the recording magnet of a magnetic recorder. This recorder is driven continuously and its pick-up or reproducing magnet is spaced along the recording medium a sufficient distance from the recording magnet to record a full line of picture signals. The recording medium has a closed geometrical configuration and in passing from the reproducing magnet to the recording magnet, it passes an erasing magnet which deletes recorded signals from the medium.

The reproducing magnet is connected to a light shutter and operates this shutter in accordance with the picture signals. An optical system and a source of light are provided for focussing, under the variable control of the light shutter, a spot of light on a light sensitive paper or photographic film wrapped around a rotatable cylinder. The cylinder is arranged to be driven through a single revolution clutch so that each time the clutch is tripped the cylinder will be rotated one revolution. The clutch is arranged to be tripped only after signals representing a complete line have been recorded in the magnetic recorder. The cylinder makes one revolution during the traversal of the reproducing magnet by a length of record medium occupied by a complete line of picture signals. Thus the recorded picture signals are transferred as light values to the sensitized sheet on the rotatable cylinder, thereby reproducing the picture. At the end of each revolution of the cylinder the optical system including the light source and light shutter is advanced one step in a direction parallel to the axis of the rotatable cylinder to bring a new line or band of the sensitized sheet into registry with the optical system preparatory to reproduction of the next set of picture values. When the transmission of picture signals is interrupted before a full line of signals has been recorded on the magnetic recorder, the clutch which drives the rotatable cylinder is not tripped and accordingly the cylinder remains stationary and the picture values represented by the incomplete line of signals are not reproduced. These partial lines of signals as well as complete lines are deleted by the erasing magnet so that the record medium as it approaches the recording magnet is always in proper condition to record picture signals.

For a complete understanding of the invention reference may be had to the following detailed description to be interpreted in the light of the accompanying drawings wherein.

Figure 1:
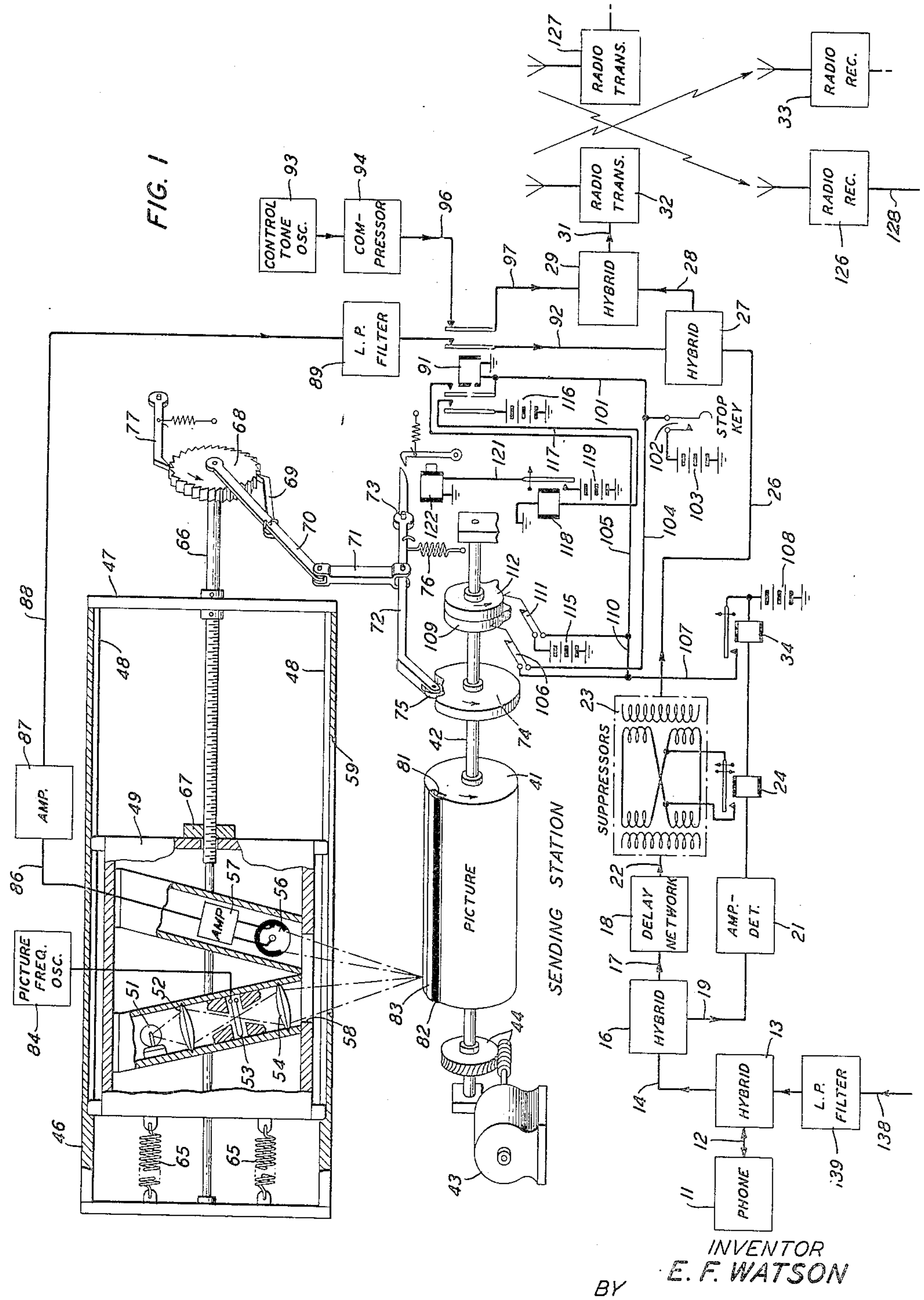
Fig. 1 is a schematic view showing a transmitting system for interpolated picture and telephone transmission.
Figure 2:
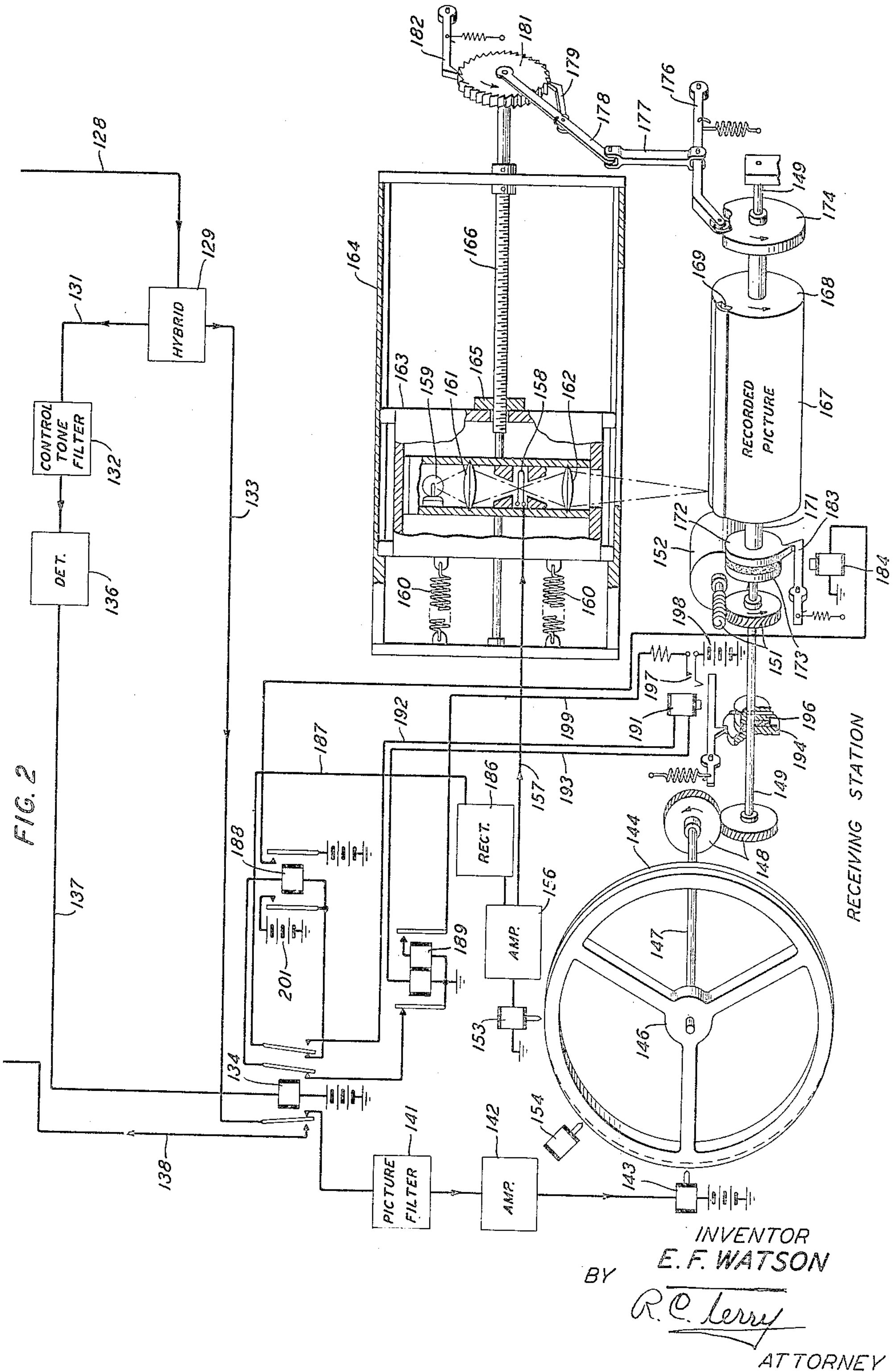
Fig. 2 is a schematic view showing a receiving system for interpolated picture and telephone signals.

With general reference to Figs. 1 and 2 the communication circuits have been represented by single conductive paths, for the sake of simplicity. Actually, of course, such paths would comprise two conductors. In the case of local control circuits, ground return paths have been indicated.

Referring now to the drawings and particularly to Fig. 1, the reference numeral 11 designates a telephone instrument comprising transmitter and receiver which is connected by local circuit 12 to one branch of a hybrid coil 13. A second branch of the hybrid coil is connected by local circuit 14 to one branch of hybrid coil 16 which has a second branch connected by local circuit 17 to the input of a delay network 18 and a third branch connected by local circuit 19 to the input of an amplifier-rectifier circuit 21. The output of delay network 18 is connected by local circuit 22 to the input of suppressor 23.

Figure 4:
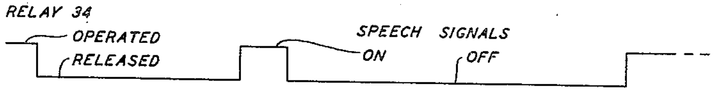

Suppressor 23 is similar to any one of several shown in Fig. 4 of Patent 2,207,720, granted July 16, 1940, to I. E. Cole et al. and comprises two transformers, one having a single input winding and a pair of output windings and the other having a pair of input windings and a single output winding. The two output windings of the input transformer are connected to the two input windings of the output transformer in criss-cross or figure-of-8 arrangement so that these four windings are connected in series in a closed loop. The conductors which establish a criss-cross connection are interconnectable through the armature and front contact of a relay 24. When relay 24 is released voltages impressed on the input winding of the input transformer develop mutual oppositions in the four interconnected windings and no voltage appears across the output winding of the output transformer. When relay 24 is operated the figure-of-8 connection is converted to a pair of straight link connections with one conductor common, and a direct transfer of voltage from the input winding of the input transformer through the link connections to the output winding of the output transformer occurs.

The output of suppressor 23 is connected by a local circuit 26 to one branch of a hybrid coil 27, a second branch of which is connected by local circuit 28 to one branch of a hybrid coil 29. The latter coil has a second branch connected by local circuit 31 to a communication circuit which is represented by radio transmitter 32 and radio receiver 33.

It will be understood that the communication channel could consist of or include a metallic telephone circuit such as a local line or a toll line or a full metallic or carrier channel of a submarine cable and that it may pass through any number of switching centers and include any number of repeaters as required in accordance with conventional telephone practices. For example, the communication channel may be a carrier wave channel of a carrier system such as that disclosed in Patent 1,904,544, granted April 18, 1933, to J. W. Schmied. In such an arrangement the local communication path 31 described above might be connected to telephone conductors 26 of Fig. 2 of the Schmied patent through an added hybrid coil. In that case, instead of radio receiver 33 of Fig. 1 of the present specification, the receiving station might be connected through an added hybrid coil to telephone conductors 26 of Fig. 3 of the Schmied patent. Correspondingly, in substitution for radio transmitter 127 and radio receiver 126 to be identified more specifically hereinafter, the local communication circuits extending therefrom might be connected through the respective added hybrid coils to the telephone conductors 26 of Fig. 3 and Fig. 2, respectively, of the Schmied patent. The disclosure of the Schmied patent is incorporated herein by reference and made a part hereof as fully as if it had been included herein in its entirety. It is also to be noted that the transmission of interpolated speech and facsimile signals by single or double sideband principles is within the scope of the present invention. For deep-sea submarine cable transmission the local communication path 31 of the present system could be connected to a path such as L·IH of O. E. Buckley et al., Patent 2,020,297, dated November 12, 1935.

Relay 24 is connected to the output of amplifier-rectifier 21 and a relay 34 is also connected to the output of the amplifier-rectifier. Relay 24 preferably has slow-operate and slow-release characteristics, both of the order of 20 milliseconds and relay 34 preferably has a fast-operate and slow-release characteristic, the release time of this relay also being of the order of 20 milliseconds. Delay network 18 preferably has a uniform delay characteristic of the order of 20 milliseconds. The reason for these delays and the relationships among them will be described later.

A picture transmitting system is shown in the upper portion of Fig. 1. It includes a picture supporting cylinder 41 secured to shaft 42 which is continuously driven from motor 43 through gears 44, and an optical scanning mechanism indicated generally by the reference numeral 46. The optical scanning mechanism 46 comprises a stationary housing 47 having internal rails 48 upon which a carriage 49 is slidably supported. Carriage 49 contains two compartments, one of which contains a light source 51, a focussing lens 52, a light beam chopper or shutter 53 and a focussing lens 54 which focusses a spot of light on cylinder 41. The other compartment contains a photoelectric cell 56 and may also contain an amplifier 57. Carriage 49 is provided with an aperture 58 to accommodate passage of a beam of light from source 51 to the surface of cylinder 41 and of reflected light from the cylinder to photoelectric cell 56 and housing 47 is provided with a registering slot 59 of sufficient length that the spot of light focussed on cylinder 41 may traverse the cylinder from end to end.

A rotatable rod 66 is journaled in housing 47 at the opposite ends thereof and is threaded for a substantial portion of its length. Carriage 49 has attached thereto a nut 67 which is preferably split to afford easy disengagement from the threaded portion of rod 66. Rod 66 has secured thereto exteriorly of the housing 47 a ratchet 68. A pawl lever 70, which carries intermediate its ends an operating pawl 69 for ratchet 68, is pivoted at one end on rod 66 and is connected at its other end by link 71 to a lever 72 pivoted at 73. Lever 72 carries at one end a cam follower 75 which engages a cam 74 secured to shaft 42. A spring 76 urges the cam follower into engagement with cam 74. Each time that the cam follower is permitted to enter the recess in cam 74 lever 70 is rocked counter-clockwise and advances ratchet 68 a distance of one tooth in counter-clockwise direction. A check pawl 77 holds ratchet 68 in the position to which it has been advanced and as the cam follower rises out of the depression in cam 74, pawl 69 is moved in clockwise direction along ratchet 68 to pick up the next tooth. The counter-clockwise rotation imparted to ratchet 68 by pawl 69 causes carriage 49 to move rightwardly, a spot of light focussed on cylinder 41 being moved along the cylinder toward the right parallel to the axis.

A picture that is to be transmitted is wrapped around cylinder 41 and is secured thereto by a clamping bar 81 the surface of which is divided longitudinally into a dark or black portion 82 and a light or white portion 83. Light shutter 53 is operated in vibratory manner by a signal generator or oscillator 84. The frequency of this is preferably within the voice range so that picture signals generated by the light beam will be of a character adapted to be transmitted over conventional telephone circuits or to modulate a radio frequency carrier within the radio transmitter 32 and to be detected within the radio receiver 33. As the picture supported by cylinder 41 is rotated the dark portion of clamping bar 82 absorbs substantially all of the incident light, the light portion of clamping bar 83 reflects substantially all of the incident light and the picture reflects variable intensities of light in accordance with the shading of the picture. Photoelectric cell 56 responds to the varying light values reflected from clamping bar 81 and the picture and generates modulated oscillatory current which is a function of the picture frequency generator 84 and the shading values of the clamping bar and picture. The output of amplifier 57 is connected by local circuit 86 to amplifier 87, the output of which is connected through local circuit 88 and low-pass filter 89 to the back contact associated with the inner right-hand armature of a relay 91. The inner right-hand armature of relay 91 is connected by local circuit 92 to the third branch of hybrid coil 27 through which the picture signals may be impressed on the radio transmitter in the same way as the speech signals are impressed on the transmitter.

The control tone generator 93 which generates a tone outside the speech frequency band and also outside the picture frequency band is connected to a compressor 94, the output of which is connected to the back contact associated with the outer right-hand armature of relay 91. The outer right-hand armature of relay 91 is connected by local circuit 97 to a third branch of hybrid coil 29 through which the control tone is impressed upon the radio transmitter.

When relay 91 is in the unoperated condition, the output of the picture transmitter and the output of the control tone oscillator are connected to the radio transmitter and with the picture mounted on cylinder 41 and the cylinder being driven by motor 43, picture signals will be transmitted. Relay 91 is energizable in a circuit from ground through the winding of the relay, conductor 101 and locking stop key 102 to battery 103. When this key is closed and relay 91 is energized, the output of the picture transmitter will be disconnected from hybrid coil 27 at the inner right-hand armature and back contact of the relay and the output of the control tone generator 93 will be disconnected from hybrid coil 29 at the back contact and outer right-hand armature of the relay. An energizing circuit for relay 91 is also traced from ground through the winding of the relay, conductors 101 and 104, contacts 106, conductor 107 and front contact and armature of relay 34 to battery 108. Contacts 106 are normally closed and are opened momentarily once per revolution of picture cylinder 41 by cam 109 secured to shaft 42. Relay 34 is energized when speech signals are generated by telephone instrument 11 and are impressed on amplifier-rectifier 21. Relay 91 will be operated immediately upon the operation of relay 34 except for the possibility that contacts 106 may be open at the time of engagement of the front contact of relay 34 by its armature and may accordingly delay the energization of relay 91.

When relay 91 is operated to suspend the transmission of picture signals a holding circuit for the relay is established through the inner left-hand armature and front contact of the relay, conductor 105, contacts 111 to battery 115, with a parallel holding circuit 110 from conductor 105, contacts of relay 34 to battery 108. Contacts 111 are normally closed and are opened momentarily once per revolution of picture cylinder 41 by cam 112 secured to shaft 42. At its outer left-hand armature and front contact the relay 91 completes a circuit from battery 116 through the noted armature and front contact of relay 91, conductor 117 and winding of slow-release relay 118 to ground. Relay 118, upon being energized under the control of relay 91 completes a circuit from battery 119, the front contact and armature of relay 118, conductor 121 and winding of electromagnet 122 to ground. The armature of electromagnet 122 serves as a latch for lever 72 to prevent the cam follower 75 carried by the lever from entering the depression in cam 74. As long as electromagnet 122 is energized and latches lever 72 in its clockwise position, the cyclic operation of ratchet 68 is suppressed and accordingly the advancement of the picture scanning beam from line to line of the picture is suppressed.

Figure 5:
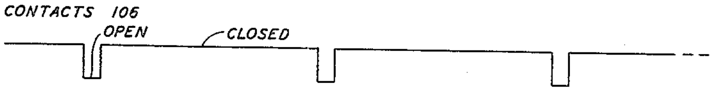
Figure 6:
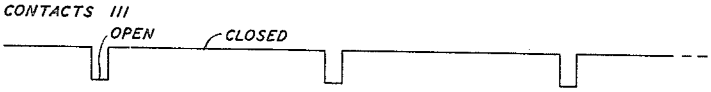
Figure 7:
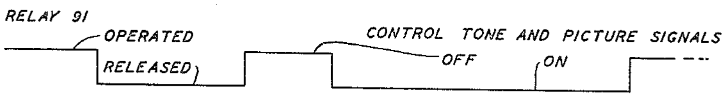
Figure 8:
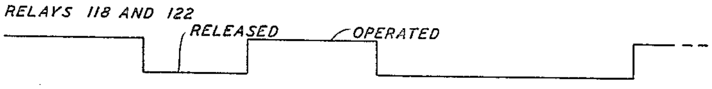
Figure 9:
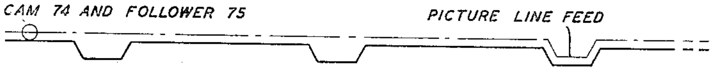

It will be assumed that relays 24, 34, 91 and 118 and magnet 122 are energized due to the transmission of speech signals from instrument 11, that a pause occurs in these signals, and that the picture scanning mechanism is partly through the scanning of a line (the first representation of line A in Fig. 3) so that the cam follower on lever 72 is engaging the high portion of cam 74, as represented in Fig. 9. Relays 34 and 24 release after about 20 milliseconds to permit, before activating suppressor 23, the transmission of the last of the speech signals through delay network 18 and into the radio transmitter. The release of relay 34 does not result in the immediate release of relay 91 because the latter relay is held energized over its holding circuit. Within the interval during which the dark portion 82 of clamping bar 81 passes under the light beam, contacts 106 and 111 open and reclose, the sequence being opening of contacts 106, opening of contacts 111, contacts 106 reclosed and contacts 111 reclosed, as represented in Figs. 5 and 6. Upon the opening of contacts 111, relay 91 releases, as represented in Fig. 7 connecting the output of the control tone generator and the output of the picture transmitter to the communication channel (represented by radio transmitter 32), disabling its holding circuit and interrupting the energizing circuit for relay 118. The latter relay has a slow-release characteristic and does not release until after contacts 106 and 111 have reclosed, the light portion 83 of clamping bar 81 has passed the spot of light and the depression in cam 74 has moved out of range of the cam follower carried by lever 72, all as indicated in Fig. 8. When relay 118 releases it releases the electromagnet 122 and the latch for lever 72 is retracted. However, at the time of release of electromagnet 122 the cam follower 75 carried by lever 72 is engaging the high portion of cam 74, so that the scanning mechanism rescans the line of the picture which it had been scanning at the time of cessation of speech signals. The signal transmitted under the control of the light portion 83 of clamping bar 81 represents a start signal and the control effected by this signal in the receiving mechanism will be described later.

If speech transmission should be resumed before the scanning of the line is completed, relay 34 will be operated immediately in response to the speech signals, as indicated in Fig. 4, and assuming that contacts 106 are closed, which will be their condition if the scanning of the line is not completed and the dark portion 82 of clamping bar 81 has not yet reached the spot of light, relay 91 will be reoperated to disconnect the picture signals and the control tone signals from the communication channel, to reestablish its locking circuit and to reenergize relay 118 which immediately reoperates electromagnet 122 which again blocks lever 72. Thereafter, upon the passage of the depression in cam 74 beneath the cam follower carried by lever 72, the cam follower will be withheld from entrance into the depression and the advancement of carriage 49 toward the right for the scanning of the next line or band of the picture will be prevented. Due to the slow-operate characteristic of relay 24, the conditioning of suppressor 23 to transmit speed signals will be delayed by an interval of approximately 20 milliseconds but the delay network 18 delays the transmission of the speech signal into the suppressor to the same extent, so that ample time is allotted for suspending the transmission of picture signals and none of the speech signals is lost.

Figure 3:
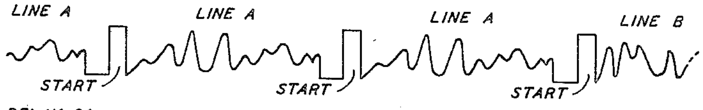
Figs. 3 to 14, inclusive are representative timing diagrams showing timing relationships within and between the transmitting and receiving systems.

Under the circumstance that speech signals do not interrupt the transmission of the picture signals, as indicated by Fig. 4 relative to the second complete line A in Fig. 3, and that the transmission of signals representing the complete line is accomplished, the cam follower carried by lever 72 remains in engagement with the surface of the cam and as the dark portion 82 of clamping bar 81 passes under the spot of light the cam follower 75 carried by lever 72 enters the depression in cam 74, rocking lever 72 counter-clockwise and rotating ratchet 68 one step counter-clockwise to move carriage 49 rightwardly. Contacts 106 and 111 open and reclose without producing any change in the circuit conditions, since relays 34 and 91 are assumed to have remained released. The transmission of picture signals representing the new line or band will thereupon proceed following the transmission of a start signal as the light portion 83 of clamping bar 81 traverses the spot of light. If speech signals interrupt the transmission of signals representing this line of the picture (represented by the line B in Fig. 3), the electromagnet 122 will prevent the rightward movement of carriage 49 at the completion of a revolution of cylinder 41 and the scanning of the line will occur repetitiously until the signals representing the line have been transmitted without interruption.

The purpose of contacts 111 is to assure that the picture transmitter, after having been disconnected from the communication channel, shall be reconnected only at the beginning of the scanning of a line and specifically just before the light portion 83 of clamping bar 81 is scanned. The purpose of contacts 106 is to assure the advancement of carriage 49 one step rightwardly in the event that the reappearance of speech signals to be transmitted occurs just as the transmission of signals representing a complete line of the picture is effected. The intent of the arrangement is that if relay 91 has not operated before contacts 106 open, the transmission of the picture line is judged to be complete and relay 91 cannot then operate until a short time later when contact 106 recloses. This interval provides a margin of adjustment for electromagnet 122 and its latch with associated arm 72, roller 75 and cam 74, so that these parts can be adjusted to meet the necessary requirements. These are: (1) if relay 91 has operated before contacts 106 open, magnet 122 must operate and latch feed lever 72 so it cannot operate; (2) if relay 91 remains unoperated until after contact 106 recloses, feed lever 72 must be left unlatched until after roller 75 has dropped sufficiently into the indent in cam 74 to assure a feeding operation. These adjustments will assure feeding after any completed line and omission of feeding after any incomplete line.

Fig. 2 shows a receiving system adapted to receive the interpolated speech and picture signals from a transmitting station of the type shown in Fig. 1. Specifically, Fig. 2 shows the receiving portion of the station of which the transmitting portion is shown in Fig. 1. The radio receiver on which signals are received is designated by the reference numeral 126 and this radio receiver may receive signals from any radio transmitter such as transmitter 127. It will be understood that radio receiver 126 must receive on a different carrier frequency than that transmitted by radio transmitter 32, otherwise the station would receive its own signals. The radio transmitter 127 would probably be located at the station having radio receiver 33, particularly if the telephone transmission is a conversation involving two-way transmission. Radio receiver 126, which may include the conventional selecting, amplifying and detecting equipment is connected by local circuit 128 to one branch of a hybrid coil 129. A local circuit 131 extends from a second branch of hybrid coil 129 to a control tone filter 132 having the necessary circuit constants to pass the control tone which accompanies picture signals and to reject picture signals and speech signals. The third branch of hybrid coil 129 is connected by local circuit 133 to the left-hand armature of a relay 134. The output of control tone filter 132 is connected to a rectifier 136 and the output of this rectifier is connected by local circuit 137 to the winding of relay 134. From this it will be apparent that when the control tone signal is received, relay 134 will be energized, whereas when the control tone signal is not received, relay 134 will be released. The back contact associated with the left-hand armature of relay 134 is connected by local circuit 138 to low-pass filter 139 and the output of this filter is connected to the third branch of hybrid coil 13 for impressing received telephone signals on the telephone instrument 11.

The front contact associated with the left-hand armature of relay 134 is connected to a filter 141 adapted to pass the picture signals, and the output of this filter is connected to an amplifier 142, the output of which is connected to recording magnet 143 of a magnetic recorder. The recording medium is a steel wire or band 144 carried by wheel 146. Wheel 146 is secured to shaft 147 which is driven through gears 148 from shaft 149. Shaft 149 is continuously driven through gears 151 from motor 152.

Spaced along the periphery of wheel 146 in the direction of rotation a distance sufficient to accommodate signals representing a little less than a complete picture line (for reasons which will be set forth hereinafter), is a reproducing or pick-up magnet 153. Positioned between reproducing magnet 153 and recording magnet 143 in the same direction is an erasing magnet 154 for erasing signals after they have traversed reproducing magnet 153, to prepare the recording medium 144 to receive incoming signals from the recording magnet 143. Erasing magnet 154 may be energized by direct current or by high frequency alternating current in accordance with conventional practices employed in erasing signals from magnetic storage tapes or wires.

Reproducing magnet 153 is connected to an amplifier 156, the output of which is connected by local circuit 157 to light shutter 158. Light shutter 158 is part of an optical system including light source 159 and focussing lenses 161 and 162 supported in a carriage 163 movable within a housing 164 by rotatable threaded rod 166 and split nut 165, the structure being similar to the scanning apparatus in Fig. 1. A sensitized sheet 167 is wrapped around cylinder 168 and is secured thereto by clamping bar 169. Cylinder 168 is secured to a sleeve 171 supported by rotatable shaft 149. Sleeve 171 also has secured thereto the driven disc 172 of a friction clutch which has its driving disc 173 secured to shaft 149. A cam 174 similar to cam 74 in Fig. 1 is secured to sleeve 171 and is engaged by a cam follower carried by a pivoted lever 176. Lever 176 is connected by link 177 to a lever 178 pivoted on threaded rod 166 and carrying a feed pawl 179 engageable with a ratchet 181 secured to rod 166. A check pawl 182 engages ratchet 181 and serves to hold the ratchet against clockwise rotation. A stop lever 183 is provided with a hook engageable with a shoulder on the periphery of clutch disc 172 to hold sleeve 171 against rotation. A clutch magnet 184 is energizable to retract stop lever 183 from holding engagement with clutch disc 172 and when the clutch magnet is energized, sleeve 171 and cylinder 168 and cam 174 which it supports are released for rotation. If clutch magnet 184 is released before the cylinder 168 completes one revolution, the cylinder will be arrested and limited to exactly one revolution and carriage 163 will be moved one picture line distance rightwardly incident to each revolution of the cylinder. The gear ratio between shaft 149 and shaft 147 is such that one revolution of cylinder 168 is accompanied by rotation of wheel 146 through the angle between recording magnet 143 and reproducing magnet 153, measured in counterclockwise direction, which is the direction of rotation of wheel 146 from recording magnet 143.

The output of amplifier 156 is also connected to a rectifier 186 which is connected by a local circuit 187 to the outer right-hand armature of relay 134. The front contact which this armature engages when relay 134 is energized in response to reception of the control tone signal is conneced through the winding of relay 188 to the inner right-hand armature of relay 134. The front contact associated with this armature is connected to the back contact of the left-hand armature of relay 189 and the armature is connected to ground.

Figure 10:
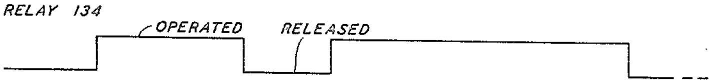
Figure 11:
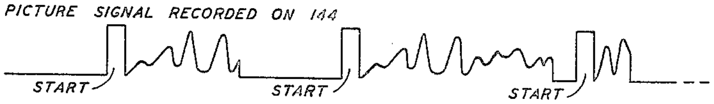

It will be assumed that picture signals are being received by recording magnet 143 and recorded on magnetic medium 144, as indicated in Fig. 11, the picture line having just begun. The line begins with the start signal which is of full amplitude because it is generated by the light portion 83 of clamping bar 81 in Fig. 1. It will also be assumed that a considerable interval had elapsed during which no picture signals were received so that the recording medium had been completely erased. Relay 134 is operated in response to the control tone signal, as represented in Fig. 10, but there is no output from rectifier 186 to energize relay 188 through the front contact of the outer right-hand armature of relay 134. Relay 189 is energizable from rectifier 186 in series with an electromagnet 191 through the back contact at the outer right-hand armature of relay 134 but there is assumed to have been no output from rectifier 186 prior to the energization of relay 134, so that neither the relay 189 nor the electromagnet 191 is energized.

It will now be assumed that the picture signals are interrupted before the transmission of a complete line of signals has been accomplished. The interruption of picture signals is accompanied by the interruption of the control tone signals so that relay 134 releases, as indicated in Fig. 10 extending the output of hybrid coil 129 to local circuit 138, low-pass filter 139 and hybrid coil 13 to telephone instrument 11 for the reception of speech signals. Wheel 146 continues to rotate without recording further signals and presents the start impulse of the partially recorded line of signals to reproducing magnet 153 about the time indicated in Fig. 12. The start signal is amplified by amplifier 156 and is rectified by rectifier 186 to cause current to flow in a circuit through conductor 187, the outer right-hand armature and back contact of relay 134, conductor 192, winding of electromagnet 191, conductor 193 and operating winding of relay 189 to ground, and relay 189 and electromagnet 191 are operated, the operation of relay 189 being indicated in Fig. 13. The armature of electromagnet 191 serves as the stop lever for a cam 194 which is mounted on shaft 149 and is rotatable therewith through a friction clutch 196 when released by the armature of electromagnet 191 upon the energization of the magnet. The armature of electromagnet 191 also closes contacts 197 completing a circuit from battery 198 through the contacts, conductor 199, the right-hand armature, front contact and right-hand winding of relay 189 to ground, thereby establishing a holding circuit for relay 189. However, the contour of cam 194 is such that it holds the armature of electromagnet 191 in the operated position until just before cam 194 completes one revolution. Since the armature of electromagnet 191 will not be held by the electromagnet after the recorded signals of the incomplete line have passed pick-up magnet 153, this armature will engage the periphery of cam 194 and move to its unoperated position to arrest the cam and permit contacts 197 to open.

Figure 14:
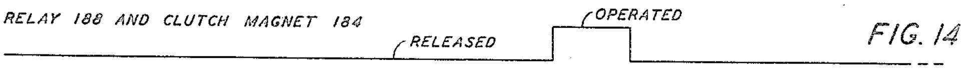

With relay 134 released, the operating circuit for relay 188 was interrupted at several points at the time that pick-up magnet responded to the start signal so that this relay did not respond to this signal of the incomplete line of picture signals and it remains released, even though there should occur in the picture signals themselves a signal of the same character and value as the start signal at least throughout the entire interval during which relay 189 is locked in the energized condition. This condition is indicated in Fig. 14. Relay 188 controls the operating circuit of clutch magnet 184 for the picture recorder through its front contact and right-hand armature. Thus relay 188 and clutch magnet 184 remain released while the start signal and the incomplete line of picture signals traverse reproducing magnet 153, so that none of the signals contained in the incomplete line is permitted to affect sensitized sheet 167 carried by cylinder 168. In the rest position of cylinder 168 the light beam impinges upon clamping bar 169, so that although the picture signals are always applied to light valve 158 over local circuit 157, the sensitized sheet is not affected. As the signals recorded on magnetic medium 144 traverse erasing magnet 154, they are erased from the recording medium. The erasure of the incomplete line of recorded signals does not result in the loss of these signals because, as previously stated, the picture transmitter rescans any interrupted line until the signals representing that line have been transmitted without interruption.

The relay 134 cannot reoperate until after all of the signals representing the incomplete line and the section of the magnetic medium 144 which the missing signals would occupy have transversed reproducing magnet 153. The reason for this is that relay 91 in Fig. 1 is releasable to reconnect the picture signal transmitter and the control tone generator to the communication channel only at the beginning of a picture line and specifically just before the generation of the start signal. Thus relay 134 will not normally reoperate and prepare the energizing circuit for relay 188 while the signals of an incomplete line are traversing reproducing magnet 153. However, in case it should be accidentally reoperated by radio interference, the relay 188 could not be operated to complete the circuit of clutch magnet 183 because relay 189 is held energized through contacts 197, and the ground connection required for energizing relay 188 is disconnected at the left-hand armature and back contact of relay 189.

Figure 13:

As soon as a pause in speech transmission causes the resumption of picture signal transmission, the control tone operates relay 134 and the picture signals are recorded on magnetic medium 144 beginning with the start signal. As in the case of the previously described picture signal receiving cycle, only the relay 134 is operated, the relays 188 and 189, and the electromagnets 184 and 191 remaining deenergized. The exception to this is that if the speech interval has been very brief, so that an incomplete line is traversing reproducing magnet 153 during the recording of the next received group of picture signals on recording medium 144, relay 189 will be locked in operated condition, as indicated in Fig. 13. It will be assumed that at least one full line of picture signals is received and recorded on recording medium 144. Accordingly, when the start signal is picked up by reproducing magnet 153 and develops a voltage in the output of rectifier 186, the circuit of relay 188, being prepared through to the rectifier by relay 134, is completed by the release of relay 189 and the relay 188 operates, in turn operating clutch magnet 184 to cause cylinder 168 to be rotated to record the picture line. At its left-hand armature and front contact, relay 188 establishes a holding circuit for itself from battery 201 through the winding of the relay, the inner right-hand armature and front contact of relay 134, the back contact and left-hand armature of relay 189 to ground. As long as relay 134 remains energized, responsive to steady reception of the control tone, relay 188 will remain locked and in turn hold clutch magnet 184 energized to cause cylinder 168 to rotate continuously and record line after line of the picture signals as they are reproduced by magnet 153, the carriage 163 being advanced one step rightwardly for each revolution of cylinder 168. The clamping bar 169 of cylinder 168 passes under the light beam as the start impulse of each line is reproduced by magnet 153 so that this signal is not recorded on the sensitized sheet 167 carried by cylinder 168.

Upon any interruption of the control tone, relay 134 will be released thus interrupting the holding circuit of relay 188 which releases and in turn releases clutch magnet 184. Thereupon the hook on clutch member 183 will be presented in the path of the shoulder on clutch disc 172 and cylinder 168 will be arrested with clamping bar 169 presented under the light beam. As wheel 146 continues to rotate, the start signal of the line of picture signals which was interrupted will be presented to reproducing magnet 153 and because relay 134 is released, rectifier 186, responding to the start signal will complete the energizing circuit of magnet 191 and relay 189, thus preventing, due to the locking of relay 189 and magnet 191 for substantially one revolution of cam 194, the renergization of relay 188 in the event that relay 134 reoperates in the meantime, until a length of the recording medium 144 adapted to accommodate a full line of picture signals and including the incomplete line of signals has traversed magnet 153.

Figure 12:
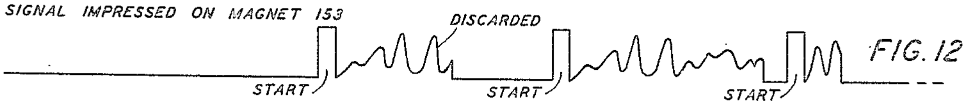

The reason that reproducing magnet 153 must be spaced along the periphery of wheel 146 from recording magnet 143 a distance slightly less than that which will accommodate a full line of picture signals from one start signal to the next will now be considered, reference being made to Figs. 5, 6, 7, 10 and 12. The test as to whether or not a received line of picture signals is to be recorded on sensitized sheet 167 must be made during an interval in which the control tone, if on, cannot be cut off to effect the release of relay 134, and if off, cannot be put on the transmission channel to operate relay 134. Such an interval occurs beginning with the opening of contacts 106, which will prevent the operation of relay 91 if relay 34 should then become operated, and ending with the release of relay 91 in response to the opening of contacts 111, if relay 34 should be unoperated at that time. Accordingly, the start signal must be presented to reproducing magnet 153 about the time that contacts 106 open. This coincides substantially with the time that the dark portion of clamping bar 81 in Fig. 1 begins to pass under the light beam. It should not be earlier than the opening of contacts 106, nor later than the release of relay 91 by contacts 111. Fig. 12 shows the approximately correct relation of the presentation of the start signals to reproducing magnet 153 relative to the opening of contacts 106 as represented in Fig. 5, the opening of contacts 111 as represented in Fig. 6, the release of relay 91 as represented in Fig. 7 and the consequential release of relay 134 as represented in Fig. 10. It will be seen that the periphery of wheel 147 between magnets 143 and 153 lacks by approximately the extent of the blank signal corresponding to the dark portion of clamping bar 81 the capacity to store a complete line from start signal to start signal.

From the foregoing it will be apparent that the test of whether or not picture values corresponding to signals contained on recording medium 144 shall be recorded on sensitized sheet 167 is made at the time the start impulse of a line is presented to reproducing magnet 153 and the determining factor is the condition of relay 134, dependent upon the presence or absence of the control tone. It will be remembered that if the control tone signal accompanying any line of picture signals is not cut off by the energization of relay 91 in Fig. 1 before contacts 106 are opened, it cannot be cut off until these contacts have been reclosed under the control of cam 109. Even if relay 34 should be operated while contacts 106 are open, so that the energizing circuit for relay 91 is completed upon the reclosure of contacts 106, and even though relay 91 is not intentionally provided with a slow operating characteristic, nevertheless there may be a measurable instant between the completion of the energizing circuit of relay 91 and the disengagement of the right-hand armatures from their back contacts. This timing relationship assures that if signals representing a full picture line have been transmitted and recorded on recording medium 144, the transmission of the control tone signal shall continue and overlap the energization of reproducing magnet 153 by the start signal at the beginning of the completely transmitted line of picture signals, thereby keeping relay 134 operated until relay 188 shall have become operated and its holding circuit established. With this arrangement any completely transmitted line of picture values will be recorded on sensitized sheet 167 and any partially transmitted line of picture signals will be deleted.

The transmission of picture signals may be suspended when the scanning mechanism has completed the scanning of a picture and the transmission of the signals representative thereof, or the transmission of picture signals may be suspended at any time as desired by the closure of locking key 102. This key completes the energizing circuit of relay 91 from battery 103 and the relay is held energized as long as the key remains closed. Under these circumstances no picture or control signals will be impressed upon the communication channel during the pauses in telephone transmission and the relay 134 in Fig. 2 will remain released, maintaining the telephone instrument at the receiving station connected to the communication channel.

The carriages 49 and 163 of the picture signal transmitter and picture reproducer respectively may be restored to their starting positions by disengaging split nuts 67 and 165 from threaded rods 66 and 166, respectively. When these nuts have been disengaged from the threaded rods, springs 65 and 160 will restore the carriages 49 and 163, respectively to their extreme left-hand positions whereupon the split nuts 67 and 165 may be reengaged with the threaded rods for transmission of another picture.

Certain modifications are within the contemplation of the invention. For example, the relay 91, instead of directly opening and closing the path from the picture transmitter to hybrid coil 27 and the path from the control tone signal generator 93 to hybrid coil 29 may instead control suppressors similar to the suppressor 23, one of which would be connected between low-pass filter 89 and hybrid coil 27 and the other would be connected between compressor 94 and hybrid coil 29.

Although the operation of the system has been described upon the basis of reception by the apparatus shown in Fig. 2, of signals transmitted from the station shown in Fig. 1, it was previously stated that Figs. 1 and 2 represent transmitting and receiving portions respectively of a single station and that there would be no occasion for the transmitter in Fig. 1 to transmit speech and picture signals to the receiving apparatus of the same station. Thus when reference was made during the description of the operation of Fig. 2 to elements or features in Fig. 1 as controlling the receiving operation of the apparatus in Fig. 2, such references were for convenience only and were applicable instead to a station like that shown in Fig. 1 but associated with radio transmitter 127, or any other radio transmitter than the transmitter 32, from which the station shown in Figs. 1 and 2 is adapted to receive speech and picture signals.

Although a specific embodiment of the invention has been disclosed in the drawings and described in the accompanying specification, it will be understood that the invention is not limited to such specific embodiment but is capable of modification and rearrangement without departing from the spirit of the invention and within the scope of the appended claims.

What is claimed is:

1. In a communication system, a speech transmitter, a storage transmitter adapted to scan visual intelligence continuously in discrete increments and to generate signal groups corresponding to said increments, a communication channel, switching means for causing the output of said speech transmitter or the output of said storage transmitter to be impressed on said channel, speech signal detecting means for subordinating transmission of said visual intelligence signals to transmission of speech, and repeat scanning means for causing the retransmission of any group of said visual intelligence signals interrupted by speech transmission.

2. In a communication system, a speech transmitter, a storage transmitter adapted to scan visual intelligence continuously in discrete increments and to generate signal groups corresponding to said increments, a communication channel, switching means for causing the output of said speech transmitter or the output of said storage transmitter to be impressed on said channel, means responsive to speech signals for operating said switching means to disconnect said storage transmitter from said channel whereby said visual intelligence signals are transmitted over said channel only during intervals of absence of speech, and repeat scanning means for causing the retransmission of any group of said visual intelligence signals interrupted by speech transmission until said group has been transmitted in its entirety without interruption.

3. In a communication system, a speech transmitter, a storage transmitter adapted to scan visual intelligence continuously in discrete increments and to generate signal groups corresponding to said increments, a communication channel, switching means for causing the output of said speech transmitter or the output of said storage transmitter to be impressed on said channel, means responsive to speech signals for operating said switching means to disconnect said storage transmitter from said channel whereby said visual intelligence signals are transmitted over said channel only during intervals of absence of speech, and repeat scanning means for causing retransmission from the beginning of any group of said visual intelligence signals interrupted by speech transmission until said group has been transmitted in its entirety without interruption.

4. In a communication system, a speech transmitter, a facsimile transmitter adapted to scan visual intelligence continuously in discrete increments and to generate signal groups corresponding to said increments, a communication channel, switching means for causing the output of said speech transmitter or the output of said facsimile transmitter to be impressed on said channel, speech signal detecting means for subordinating transmission of said visual intelligence to transmission of speech, and means for causing new discrete increments of said visual intelligence to be scanned only upon the uninterrupted transmission of a complete signal group.

5. In a communication system, a speech transmitter, a facsimile transmitter adapted to scan visual intelligence in discrete increments and to generate signal groups occupying equal time intervals, a communication channel, means for causing the output of said speech transmitter or the output of said facsimile transmitter to be impressed on said channel, means responsive to momentary intervals of silence of said speech transmitter for connecting said facsimile transmitter to said channel and responsive to resumption of speech for disconnecting said facsimile transmitter from said channel, and means for causing repetitious generation of any group of said visual intelligence signals until said group has been impressed on said channel uninterruptedly.

6. In a communication system, a speech transmitter, a picture transmitter adapted to scan a picture in lines and generate signals corresponding to the picture values, a communication channel, means for causing the output of said speech transmitter or the output of said picture transmitter to be impressed on said channel, means responsive to silent intervals of said speech transmitter occurring as idle intervals or as pauses during speech communication for connecting said picture transmitter to said channel, and means for delaying the scanning of any line of said picture until the occurrence of uninterrupted transmission of signals representing the preceding line in its entirety.

7. In a communication system, a speech transmitter, a facsimile transmitter adapted to scan visual intelligence continuously in increments and to generate signal groups corresponding to said increments, a communication channel, means for causing the output of said speech transmitter or the output of said facsimile transmitter to be impressed on said channel, means responsive to silent intervals of said speech transmitter occurring as idle intervals or pauses during speech communication for connecting said facsimile transmitter to said channel, and means for delaying the connection of said facsimile transmitter to said channel until the beginning of a signal group.

8. In a communication system, a speech transmitter, a storage transmitter adapted to generate other intelligence signals in discrete groups, a communication channel, switching means for causing the output of said speech transmitter or the output of said storage transmitter to be impressed on said channel, speech signal detecting means for subordinating transmission of said other intelligence signals to transmission of speech whereby interruption of any discrete group of said other intelligence signals may occur, a speech receiver, means for provisionally recording said other intelligence signals, means for connecting said speech receiver or said recording means to said channel, means for producing from said provisionally recorded signals a visual record of the intelligence represented thereby, and means for precluding the production of a visual record corresponding to an incompletely recorded group of said provisionally recorded signals.

9. In a communication system, a speech transmitter, a storage transmitter adapted to generate other intelligence signals in discrete groups, a communication channel, switching means for causing the output of said speech transmitter or the output of said storage transmitter to be impressed on said channel, speech signal detecting means for subordinating transmission of said other intelligence signals to transmission of speech whereby interruption of any discrete group of said other intelligence signals may occur, means for transmitting a control signal concurrently with said other intelligence signals, a speech receiver, means for provisionally recording said other intelligence signals, means responsive to absence or presence of said control signal for connecting said speech receiver or said recording means to said channel, means for producing from said provisionally recorded signals a visual record of the intelligence represented thereby, and means for precluding the production of a visual record corresponding to an incompletely recorded group of said provisionally recorded signals.

10. In a communication system, a speech transmitter, a storage transmitter adapted to transmit other intelligence signals in discrete groups including a start signal preceding each group, a communication channel, switching means for causing the output of said speech transmitter or the output of said storage transmitter to be impressed on said channel, speech signal detecting means for subordinating transmission of said other intelligence signals to transmission of speech whereby interruption of any discrete group of said other intelligence signals may occur, means for transmitting a control signal concurrently with said other intelligence signals, a speech receiver, means for provisionally recording said other intelligence signals, means responsive to absence or presence of said control signal for connecting said speech receiver or said recording means to said channel, means for producing from said provisionally recorded signals a visual record corresponding to said other intelligence signals, and means effective under concurrent control of said control signal and said start signal for activating said visual record producing means.

11. In a communication system, a speech transmitter, a storage transmitter adapted to generate other intelligence signals in discrete groups occupying equal time intervals and including a start signal preceding each group, a communication channel, switching means for causing the output of said speech transmitter or the output of said storage transmitter to be impressed on said channel, speech signal detecting means for subordinating transmission of said other intelligence signals to transmission of speech whereby interruption of any discrete group of said other intelligence signals may occur, a speech receiver, means for provisionally recording said other intelligence signals, means for connecting said speech receiver or said recording means to said channel, means for producing from said provisionally recorded signals a visual record of the intelligence represented thereby, means for activating said visual record producing means, and means responsive to the start signal of an incomplete group of said other intelligence signals for precluding operation of said activating means for at least one of said time intervals.

12. In a communication system, a speech transmitter, a storage transmitter adapted to generate other intelligence signals in discrete groups, a communication channel, switching means for causing the output of said speech transmitter or the output of said storage transmitter to be impressed on said channel, speech signal detecting means for subordinating transmission of said other intelligence signals to transmission of speech whereby interruption of any discrete group of said other intelligence signals may occur, a speech receiver, means for provisionally recording said other intelligence signals, means for reproducing said other intelligence signals in the same form and order as recorded, means for producing a visual record of the intelligence represented by said reproduced signals, means for precluding the production of a visual record corresponding to an interrupted group of said other intelligence signals, and means for erasing the record of said other intelligence signals following the reproduction thereof.

13. In a communication system, means for continuously generating signals representing picture values in discrete groups including a start signal preceding each group, means for generating a control tone signal, a communication channel, means for impressing said picture value signals and said control tone signal on said channel, means associated with said channel for receiving said signals, means operable in start-stop manner for producing a visual record of picture values corresponding to said picture value signals, and means controlled jointly by said start signals and said control tone signal for starting said visual record producing means.

14. In a communication system, a picture transmitter, a speech transmitter, a communication channel common to said transmitters, means for scanning a picture line by line, means for transmitting scanning signals on said channel, means resposive to speech for interrupting transmission of said scanning signals at any instant, and means for automatically repeating the scanned signals for any scanning line in the event of interruption of transmission of said scanning signals before completion of transmission of said line.

15. In a communication system, a speech transmitter, a picture transmitter, a picture recorder, a speech receiver, a communication channel common to said transmitters, recorder and receiver, means for scanning a picture line by line, means for transmitting scanning signals on said channel, means responsive to speech for interrupting transmission of said scanning signals at any instant, and means for precluding the recording by said picture recorder of a partial line in the event of interruption of transmission of said scanning signals before completion of transmission of said line.

16. In a communication system, a picture transmitter, a speech transmitter, a communication channel common to said transmitters, means for scanning a picture in lines, means for transmitting scanning signals on said channel, means responsive to speech for interrupting transmission of said scanning signals at any instant, means for advancing the scanning means to the next line upon completion of the scanning of a line, and means controlled by said interrupting means in the event of interruption of transmission of said scanning signals before completion of transmission of a line for precluding operation of said advancing means.

17. In a picture transmission system, a picture transmitter including means for continuously scanning a picture in increments having definite beginnings and endings, a transmission channel, means for connecting said transmitter to said channel, means operable at random relative to said scanning means for preparing said connecting means for operation, and means controlled by said scanning means for operating said connecting means only at a time immediately preceding the beginning of an increment.

18. In a communication system, a picture transmitter, a speech transmitter, a communication channel common to said transmitters, means for scanning a picture line by line, means for transmitting scanning signals on said channel, means responsive to speech for interrupting transmission of said scanning signals at any instant, a magnetic recorder adapted to provisionally record said scanning signals as received over said channel, a picture reproducer adapted to reproduce a picture line by line from said provisionally recorded signals, and means for precluding operation of said reproducer in response to signals of an interrupted scanning line.

19. In a communication system, a picture transmitter, a speech transmitter, a communication channel common to said transmitters, means for scanning a picture line by line, means for transmitting scanning signals on said channel, means responsive to speech for interrupting transmission of said scanning signals at any instant, a magnetic recorder adapted to provisionally record said scanning signals as received over said channel, a picture reproducer adapted to reproduce a picture line by line from said provisionally recorded signals, means for precluding operation of said reproducer in response to signals of an interrupted scanning line, and means for automatically repeating the scanned signals of any scanning line in the event of interruption of transmission of said scanning signals before completion of transmission of said line.

EDWARD F. WATSON.

REFERENCES CITED

The following references are of record in the file of this patent:

UNITED STATES PATENTS

| Number | Name | Date |
|---|---|---|
| 1,771,820 | Rtcheouloff | July 29, 1930 |
| 1,852,727 | Horst | Apr. 5, 1932 |
| 2,075,898 | Horton | Apr. 6, 1937 |
| 2,175,388 | Gurley | Oct. 10, 1939 |
| 2,181,564 | Goldsmith | Nov. 28, 1939 |
| 2,207,720 | Cole et al. | July 16, 1940 |
| 2,220,889 | Cole | Nov. 12, 1940 |
| 2,266,194 | Guanella | Dec. 16, 1941 |
| 2,314,471 | Wright | Mar. 23, 1943 |
| 2,378,746 | Beers | June 19, 1945 |
| 2,402,083 | Reid | June 11, 1946 |